UNITED STATES PATENT OFFICE.

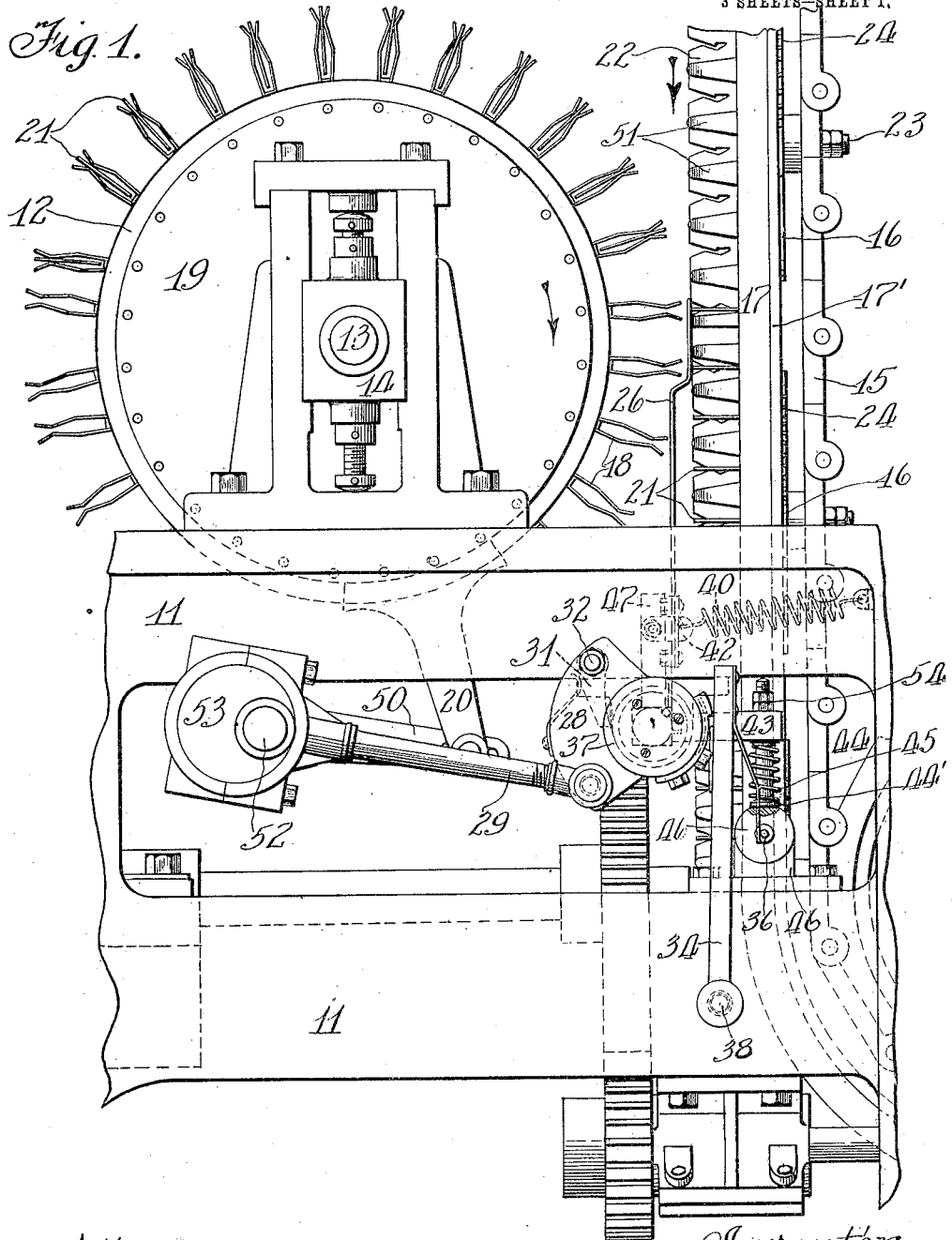

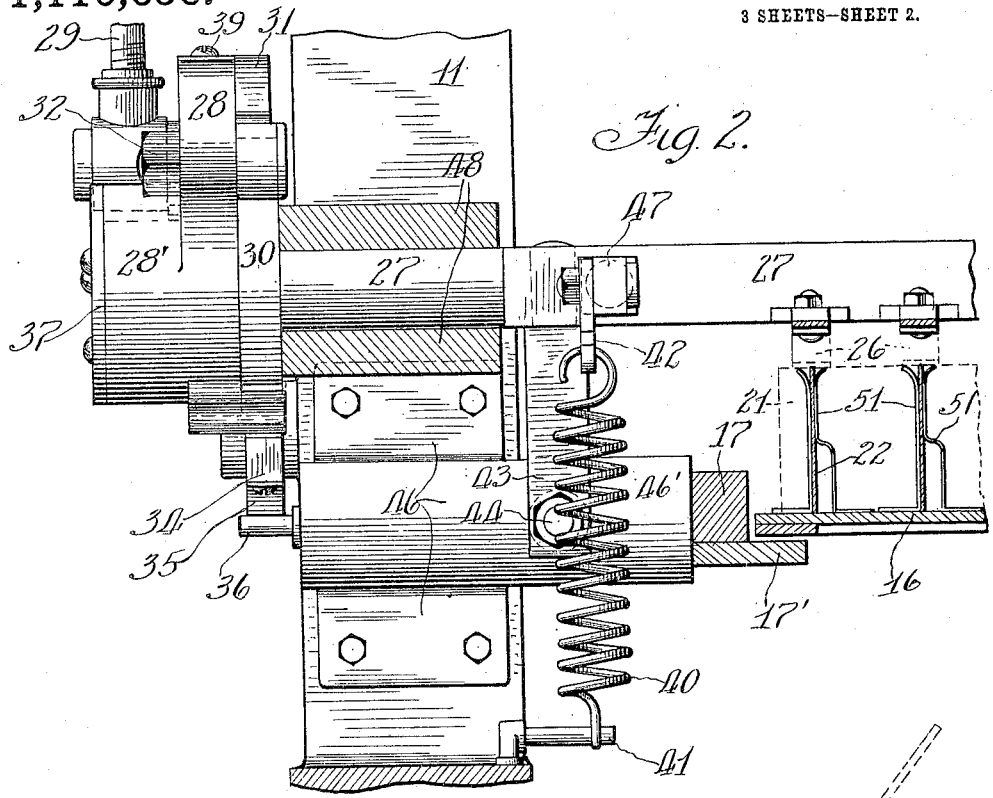

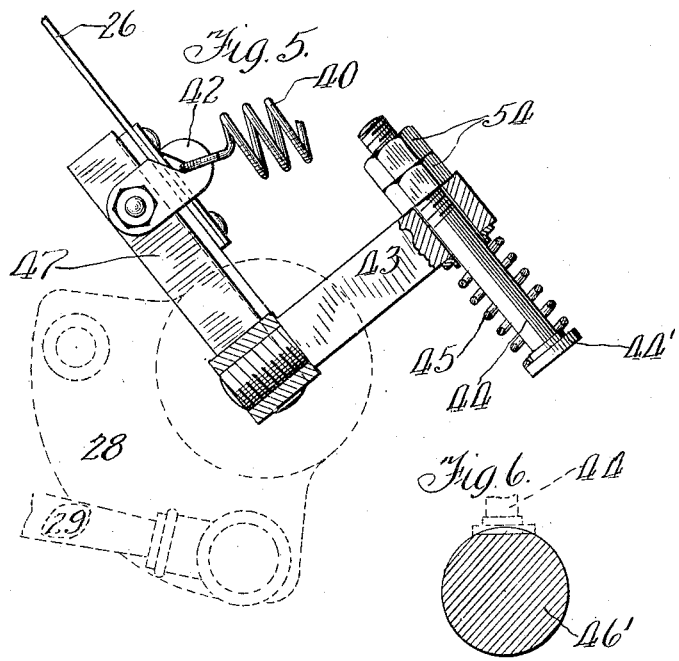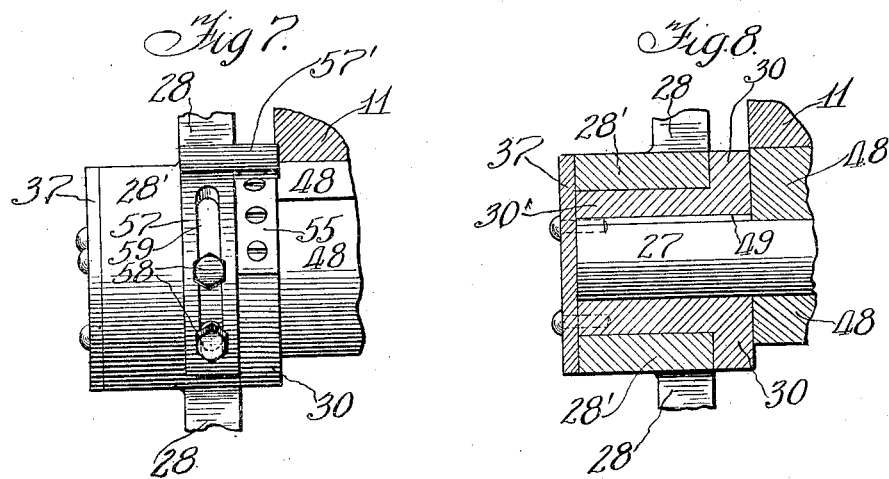

JOSEPH STARMAN, OF CEDAR RAPIDS, IOWA, ASSIGNOR TO NORTH STAR MANUFACTURING COMPANY, OF CHICAGO, ILLINOIS, A CORPORATION OF ILLINOIS.

CELL-CASE MACHINE.

1,110,656.          Specification of Letters Patent.      Patented Sept. 15, 1914.

Application filed February 21, 1911. Serial No. 610,089.

*To all whom it may concern:*

Be it known that I, JOSEPH STARMAN, a citizen of the United States, residing at Cedar Rapids, in the county of Linn and State of Iowa, have invented certain new and useful Improvements in Cell-Case Machines, of which the following is a specification.

This invention relates to improved means, in a filler making machine, for feeding and assembling the filler elements or webs which are commonly used in packing cases, such, for instance, as are used for shipping eggs.

In my pending application No. 601,149, filed January 6, 1911, I have disclosed means for punching and shearing filler elements and feeding them to a rotatory assembling mechanism from which the complete filler is ejected ready for use. The machine as a whole is generally symmetrical in form and is provided on each end with a punching and shearing mechanism for the two kinds of elements, respectively, which in the assembled filler extend crosswise of each other and are interlocked in position. In the central part of the machine there is a vertically arranged assembling mechanism, having an endless chain on which carrier trays or assembling forms are mounted for receiving the filler elements. The elements are fed successively to these trays from opposite sides of the central mechanism as the said trays pass first upwardly on one side and then downwardly on the other side, respectively, in their course of rotation on the said chain. The trays are given a quarter turn at the topmost point so as to bring the filler elements coming from one side crosswise to those from the other side of the machine. The completed fillers are ejected from the assembling trays when they reach a position at the bottom of the machine. When the empty trays are still at their lowermost position they are again given a quarter turn, bringing them back to their original position ready for another set of filler elements. Cylindrical sets of feeder disks having suitable fingers thereon are mounted on each side of the assembling apparatus and convey the said filler elements from the respective punching presses to the assembling device and deposit them in a definite way interlocking with one another on the said trays. Suitable fingers mounted on a rock shaft are provided to slide the filler strips from the disk fingers to the tray fingers at the moment they come into adjacent positions. These fingers lie normally between the said disks on the side toward the trays. Hitherto the said rock shaft fingers have been actuated by an ordinary crank arm and pitman rod mechanism, the resultant oscillatory motion of the fingers being substantially the same in both directions forward and backward without regard for any special acceleration in any part of their motion.

The principal object of my present invention is to provide improved mechanism for transferring the filler elements from the conveying disk mechanism to the assembling trays.

Another prime object is to increase the speed and resultant output of the machine by applying spring actuation to the transferring fingers. I also aim to greatly accelerate the motion of said fingers periodically in a certain part of their movement, thereby enabling greater speed and output.

Other objects of my invention relate to simplicity of construction, economy of manufacture and facility for use.

With these and other objects in view, as will be more fully set forth and made apparent, the invention consists of certain novel features of construction, combination and arrangement of parts.

My invention is more fully disclosed by reference to the accompanying drawings showing a preferred embodiment in which—

Figure 1 is a side elevation of that part of the machine which comprises mechanism for conveying the filler elements from the punch press on the left (but not here shown) to the assembling trays on the right. It should be understood that this mechanism is substantially duplicated on the opposite side of the central assembling device, though it is deemed sufficient for my present purpose to show one side only. Fig. 2 is an enlarged top plan view of the mechanism which controls the action of the fingers which slide the filler elements from the conveyer disks to the assembling trays, said fingers being shown, as in Fig. 1, in their actuated position, adjacent the assembling trays. Fig. 3 is an enlarged elevation of the main part of the said finger-controlling mechanism, the pitman rod being thrust inward toward the center and the oscillatory fingers being turned back away from the trays. Fig. 4 is similar to Fig. 3, except the pitman rod is withdrawn, as in Figs. 1 and 2, instead of thrust forward. Fig. 5 shows in front elevation an enlarged detail, partly in section, of the rock shaft mechanism which controls the transfer fingers. Fig. 6 is an enlarged vertical section across the bracket hub upon which the cushioning plunger seats when the transfer fingers are actuated. Fig. 7 is an enlarged side elevation of the mechanism connected to the front end of the rock shaft on which the transfer fingers are mounted, facing toward the left on Fig. 1. Fig. 8 is an enlarged longitudinal section through the front end of the rock shaft and controlling mechanism along the line 8 of Fig. 4.

In all of the drawings like reference numerals refer to like parts.

I will at this point particularly describe those parts of the machine which are directly related to my present invention.

In Fig. 1 is shown a central portion of the main frame 11 on which the various parts are mounted. The conveyer mechanism designated 12 is rotatably mounted on a shaft 13 having adjustable bearings 14 suitably mounted on said frame 11. At one side of the conveyer is shown a portion of an endless chain 15 on which the assembling trays 16 are mounted. A portion of the stationary guide 17—17' is shown in front of the main body of the trays. The direction of motion is indicated by the arrows. The conveyer 12 consists chiefly of two sets of disk-shaped elements, one set comprising rotary disks 19 bearing fingers 18 and adapted to rotate in unison in a clockwise direction, and the other set comprising adjustable but non-rotatable disks held stationary by the corresponding arms 20 extending therefrom on the side opposite that traversed by the filler elements 21. These disks are arranged alternately on the shaft 13, a rotatable disk 19 being in front, and the others not being shown in the drawings herewith.

In Fig. 1 the trays equipped with fingers 51 are shown bearing a set of vertically positioned filler elements 22 descending on one side of the assembling device. Here the trays are receiving the second set of elements 21 which are inserted crosswise of the elements 22, the latter having been set in place from the other side of the assembling frame at a time when these particular trays were moving upward, and the tray having been given a quarter turn when at the top of its course.

The trays 16 are rotatably mounted on the chain 15 by means of pivotal bolts 23. Toothed segments 24 on each of said trays are adapted to co-act with a corresponding rack at the top and bottom of the frame so as to give the trays a quarter turn in passing.

As the conveyer here shown, bearing fingers 18, rotates in a clockwise direction (Fig. 1) filler elements 21 are successively brought opposite slots in the elements 22 held by fingers 51 on the trays 16, whereupon they are pushed forward by fingers automatically from the former into engagement with the latter and carried downward in completely assembled condition.

In order to slide the elements 21 out from between fingers 18 and into engagement with elements 22 at the moment they come into adjacent positions, a set of long resilient fingers 26 are provided. These fingers are attached at one end to a rock shaft 27 and are arranged to rest normally between the disks of conveyer 12. Means are provided to periodically turn said rock shaft and thereby oscillate said fingers forward and backward, thereby transferring a pair of elements 21 at each oscillation forward. My invention relates particularly to this finger oscillating mechanism. In the preferred embodiment of my invention this oscillating mechanism comprises a shaft 27 on which the fingers 26 are mounted, a bracket 48 depending from the frame 11 for supporting the said shaft, a spring 40 tending to rotate the shaft 27 in a clockwise direction, (referring to Fig. 1) a ratchet hub element 30 keyed to said shaft, a segmental web or crank hub element 28 rotatably pivoted on said hub 30 and concentric therewith, a pawl 31 on said element 28 adapted to engage said element 30, a pitman rod 29 pivoted at one end to said element 28 and adapted to oscillate same, said pitman being connected at its other end to an eccentric 53 attached to the shaft 52 which is driven by any suitable means, as from the main drive shaft of the machine, and another element 34 of the nature of a pawl adapted to normally lock with and hold said element 30 from actuation by the tension of the spring 40, and adapted to release when forced backward by an element 57' attached to the segment 28.

The fingers 26 are fastened directly to the shaft 27 which though round at its bearing has a smooth side where the fingers are attached. Near the front end of the shaft 27 are attached transversely two arms 47 and 43. Arm 47 extends upward parallel to the fingers, and has attached to it a fastener 42 to which is attached one end of a spring 40, the other end being held by a pin 41 on the frame 11 at the right (on Fig. 1). The other arm 43 extends to the right and on its outer end supports a spring cushion comprising the bolt 44 fitting loosely in the end of arm 43 and a spring 45 one end of which bears on the arm 43 and the other against the head 44' of bolt 44. Adjustment of the spring tension may be obtained by means of the set nuts 54. When the fingers are actuated the cushion bolt 44 is adapted to seat on the hub 46' of the bracket 46 which is fastened to the frame 11. (See Figs. 5 and 6.)

The ratchet hub element 30 comprises a sleeve portion 30' keyed to the shaft 27 and a radial web element integral with the rear portion thereof. This web part has a radial ratchet notch 61 on one side and a thin strip 55 attached to its opposite outer peripheral edge, said notch and strip being adapted to engage pawl elements 31 and 34 respectively, as hereinafter described.

The pawl bearing hub element 28 comprises a cylindrical portion 28' fitting freely on sleeve 30' of element 30 concentric therewith and with the shaft 27, and a radial web portion integral with the rear end of 28' but extending on one side only, the hub part extending on the other side substantially flush with the outer edge of the web on element 30. This is best shown in Figs. 7 and 8. The deep segmental web of element 28 on one corner bears a pawl 31, pivoted on a pin 32 and adapted to be held by spring 33 against the outer edge of web 30 and at times in engagement with notch 61 on said web 30. On the opposite corner at 56 is pivoted one end of the pitman 29 which is reciprocated by the eccentric 53 on shaft 52. On the opposite side of element 28 on the inner end of the hub part 28' is adjustably attached a strip 57 held preferably by screws 58 set in the slot 59. Integral with the upper end of the said strip 57 is a cross element 57' extending back over the strip 55 which is attached to the web of element 30. An end plate 37 is attached to the outer end of hub 30' and serves to hold the hub 28' in place.

The rod 34 serves substantially as a pawl and engages element 30. It is pivoted at its lower end on pin 38 attached to the frame 11. This rod is pressed against web 30 by a spring 35 which reacts against pin 36 on bracket 46. A strip 60 is attached to rod 34 near the upper end on the side toward the rock shaft. This strip 60 is substantially integral with rod 34 and is adapted to slip under and engage strip 55 when element 30 is rocked back far enough to so permit, as when in its normal position. This rod 34 extends upward sufficiently to engage and be pressed outwardly from hub 30 by the cross element 57' when the latter is rocked downward and toward the center of the machine, as when the pitman 29 is farthest withdrawn and the transfer fingers 26 are to be rocked forward by spring 40.

My improved rock bar oscillating mechanism operates as follows: When two sets of loaded disk fingers 18 come into the proper position for having their load transferred to an assembling tray, the pitman reaches such a position in its outward movement that the cross element 57' on the oscillating web 28 engages the rod 34 and presses it backward so as to disengage strip 60 thereon from under strip 55 on the web of element 30, as best shown in Fig. 4. This releases hub 30 and lets the rock shaft spring the fingers 26 forward under the influence of spring 40, until cushion bolt 44 seats against stud 46' and notch 61 approaches nearly or quite into engagement with pawl 31. Then, as the motion of pitman 29 and web 28 reverses, the cross element 57' is immediately moved back clear of rod 34. The pawl 31 will definitely engage notch 61 and force element 30 and with it the rock shaft 27 back to the normal position against the tension of spring 40. The spring 35 tends to press the said rod 34 back against element 30. As the rock shaft elements approach their normal withdrawn position the strip 55 on element 30 is carried upward far enough to permit strip 60 on rod 34 to advance and engage therewith on its under side thus locking the rock shaft against another forward turn until the web of element 28 has again advanced far enough to cause the strip 57' to again force back and unlock the rod 34 from engagement with element 30. When, however, element 28 has swung outward again and element 57' engages pawl 34 the spring 40 quickly actuates the rock shaft 27 again. Thus the oscillation is periodically recurrent according to a fixed cycle of events more or less subject to adjustment, the principal feature of which is the sudden turning movement of the rock shaft when released by the rod 34 and the instantaneous transfer of the filler elements from the conveyer to the assembling tray.

It is understood that the mechanism above described is substantially alike on each side of the assembling tray mechanism.

While I have herein shown and particularly described some embodiment of my invention, I do not wish to limit myself to the precise constructions as herein shown and particularly described, as many modifications may be made by those skilled in the art without departing from the spirit of my invention.

I claim as my invention:

1. In a transferring mechanism for cell case machines, a conveyer, trays adjacent thereto, means for moving said trays, and means for transferring filler elements from said conveyer to said trays, said means being actuated quickly in its transferring movement and slowly in the reverse direction.

2. In a transferring mechanism for cell case machines, a rotary conveyer, and endless series of assembling trays adjacent thereto, means for moving said trays past said conveyer, and oscillatory means for transferring filler elements from said conveyer to said trays, said means being actuated more speedily in one direction than the other.

3. In a cell case machine, the combination of a rotary conveyer; trays adjacent thereto; fingers between said conveyer and trays; a rock shaft on which said fingers are mounted; a spring to actuate said shaft in one direction; and other means to actuate said shaft in the opposite direction.

4. In a cell case machine, the combination of a rotary conveyer for carrying filler elements; an endless set of filler assembling trays adjacent thereto; means for moving said trays; a plurality of transferring fingers adapted to actuate between said conveyer and trays; a rock shaft on which said fingers are mounted; a spring attached to actuate said shaft in one direction; and other means comprising ratchet and pawl mechanism to actuate said shaft in the opposite direction.

5. In a cell case machine, the combination of a rotary conveyer; a chain of trays passing adjacent to said conveyer; fingers positioned between said conveyer and trays; a rock shaft on which said fingers are mounted; bearings for said shaft; a ratchet hub element rigidly attached to said shaft; pawl elements co-acting with said ratchet element, the pivot for one being fixed and the other reciprocatory; and separate elements tending to oscillate said shaft in opposite directions.

6. In a cell case machine, the combination of a continuously-moving rotary conveyer; a continuously-moving series of trays passing adjacent to said conveyer; means on said conveyer and trays to carry filler elements; a plurality of fingers positioned between said conveyer and trays; a rock shaft on which said fingers are mounted; bearings for said shaft; a pawl-engaging ratchet hub element substantially integral with said shaft; pawl elements co-acting with said pawl-engaging element; and separate elements tending to oscillate said shaft in opposite directions, one acting slowly and the other quickly.

7. In a cell case machine, the combination of a rotary conveyer; trays adjacent thereto; fingers between said conveyer and trays; a rock shaft on which said fingers are mounted; a spring to actuate said shaft in one direction; a reciprocatory ratchet and pawl mechanism to rock said shaft in the opposite direction; and means to lock and to unlock said shaft in its restored position.

8. In a transferring mechanism for cell case machines, the combination of a rotary conveyer, assembling trays adjacent thereto, means for moving said trays past said conveyer, automatic means for transferring filler elements from said conveyer to said trays, said means comprising a rock shaft, bearings therefor, fingers mounted thereon, a spring adapted to rock said shaft and oscillate said fingers from a position adjacent said conveyer to a position adjacent said trays, a reciprocatory ratchet and pawl mechanism adapted to rock said shaft and oscillate said fingers in the opposite direction, means to lock said shaft in its restored position, and means to periodically disengage said lock.

9. In a cell case machine, the combination of a series of forms, a conveyer arranged to present strips to said forms, and mechanism for transferring the strips from said conveyer to said forms comprising a transferring device, spring means for moving said device in the direction of its transferring movement, means for positively moving said device in the opposite direction, and means for locking said device and for releasing the device to movement by said spring means.

10. In a cell case machine, the combination of a series of forms, a conveyer arranged to carry strips adjacent to said forms, and mechanism for transferring the strips from said conveyer to said forms comprising a transferring device, spring means for moving said device in a direction to transfer the strips, means for positively moving said device in the opposite direction, and a locking member arranged to hold said device in its initial position, said locking member being arranged to be withdrawn to release said transferring device to movement under the influence of said spring means.

11. In a cell case machine, the combination of an endless series of forms, a conveyer arranged to carry strips adjacent to said forms, a series of pivoted fingers arranged to transfer the strips from said conveyer to said forms, spring means tending to swing said fingers in a direction to transfer the strips, means for positively swinging said fingers in the opposite direction, a locking member arranged to hold said fingers in their initial position, and means for tripping said locking member to permit said fingers to swing under the influence of said spring means.

12. In a cell-case machine, the combination of two continuously moving agencies positioned close together and both having rows of holders adapted to contain filler strips, and means for quickly transferring the strips from one of said agencies to the other when said holders are in register, said means comprising a spring actuated transferring device and means for locking said device against movement and for releasing the device to permit transferring movement thereof by said spring.

13. In a cell case machine, the combination with two agencies positioned close together and each adapted to contain filler elements, of means for quickly transferring the filler elements from one of said agencies to the other comprising a transferring device, a spring tending to move said device in the direction to transfer the strips, means for moving said device in the opposite direction, a toothed member moving with said device, and a locking dog with which said member engages for holding the transferring device in its initial position, said dog being arranged to be withdrawn to permit movement of the transferring device under the influence of said spring.

14. In a cell-case machine, the combination with two continuously moving instrumentalities having rows of holders arranged to contain filler elements, of mechanism for transferring the filler elements from one of said devices to the other when two opposing rows of holders are in register, said mechanism comprising a series of pivoted fingers, and means for imparting a quick swinging movement to the fingers to transfer the strips and for imparting a slower movement to the fingers in the opposite direction.

15. In a cell case machine, the combination with two instrumentalities arranged to contain filler elements, of mechanism for transferring the filler elements from one of said instrumentalities to the other, said mechanism comprising a transferring device, spring means tending to move said device in the direction to transfer the filler elements, a continuously reciprocating member having a pawl and ratchet connection with said device for moving the latter in the opposite direction, and withdrawable means for locking said device when it reaches the end of such opposite movement.

16. In a cell case machine, the combination with two instrumentalities arranged to contain filler elements, of mechanism for transferring the filler elements from one of the instrumentalities to the other, comprising a rock shaft, fingers fixed on said shaft and arranged to transfer the filler elements, a spring tending to rock said shaft in the direction to transfer the filler elements, a continuously oscillating member, a pawl carried thereby, a ratchet element fixed on said shaft and arranged to be engaged by said pawl for rocking said shaft in the opposite direction, a spring pressed locking member arranged to hold said shaft in approximately the position to which it is moved by said pawl, and means for tripping said locking member to release said shaft to movement under the influence of said spring.

In testimony whereof I hereunto affix my signature in the presence of two witnesses.

JOSEPH STARMAN.

Witnesses:
J. F. SCHREINER,
THEO. L. VALERIUS.

Copies of this patent may be obtained for five cents each, by addressing the "Commissioner of Patents, Washington, D. C."